United States Patent [19]

Westhoff

[11] Patent Number: 4,838,843
[45] Date of Patent: Jun. 13, 1989

[54] TOOTHED BELT

[75] Inventor: William L. Westhoff, Denver, Colo.

[73] Assignee: The Gates Rubber Company, Denver, Colo.

[21] Appl. No.: 368,946

[22] Filed: Apr. 16, 1982

[51] Int. Cl.[4] .............................................. F16G 1/28
[52] U.S. Cl. .................................... 474/205; 474/250; 474/268
[58] Field of Search ................ 474/205, 250, 251, 260

[56] References Cited

U.S. PATENT DOCUMENTS

| | | | |
|---|---|---|---|
| 2,831,359 | 4/1958 | Carle | 474/251 X |
| 3,313,166 | 4/1967 | Elster | 474/205 X |
| 3,404,578 | 10/1968 | Koch et al. | 474/205 X |
| 3,621,727 | 11/1971 | Cicognani | 474/205 |
| 3,656,360 | 4/1972 | Fix | 474/250 |
| 3,937,094 | 2/1976 | Cicognani | 474/205 |
| 3,964,328 | 6/1976 | Redmond, Jr. | 474/205 |
| 3,968,703 | 7/1976 | Bellmann | 474/237 X |
| 3,969,568 | 7/1976 | Sperley | 428/297 |
| 3,977,265 | 8/1976 | Worley et al. | 474/205 X |
| 3,989,868 | 11/1976 | Bell et al. | 428/161 |
| 4,003,269 | 1/1977 | Haines | 474/250 |
| 4,019,941 | 4/1977 | Prince et al. | 156/179 |
| 4,037,485 | 7/1977 | Hoback | 474/148 |
| 4,048,865 | 9/1977 | Bell et al. | 474/205 |
| 4,127,039 | 11/1978 | Hollaway, Jr. | 474/263 |
| 4,200,325 | 4/1980 | Johnson | 294/74 |
| 4,228,692 | 10/1980 | Jacob et al. | 474/251 |
| 4,311,474 | 1/1982 | Standley | 474/205 |
| 4,374,977 | 2/1983 | Fujiwara et al. | 528/348 |
| 4,392,842 | 7/1983 | Skura et al. | 474/205 |
| 4,407,333 | 10/1983 | Fowkes | 139/415 |
| 4,410,314 | 10/1983 | Miranti, Jr. et al. | 474/251 |

FOREIGN PATENT DOCUMENTS

| | | | |
|---|---|---|---|
| 446130 | 1/1948 | Canada | 474/205 |
| 57-12146 | 1/1982 | Japan | 474/205 |
| 1404250 | 8/1975 | United Kingdom | 474/205 |
| 2013303 | 8/1979 | United Kingdom | 474/205 |

OTHER PUBLICATIONS

*Modern Textiles*, "Kevlar Aramid" pp. 26–30, by R. E. Wilfong and W. G. Mikell, Nov. 1976.
DuPont, Processing Yarns of Kevlar Aramid for Weaving, Bulletin K-3, Dec. 1978.
DuPont, KEVLAR 49 Data Manual, Jan. 1978, pp. XI-F.
"Characteristics–Under Special Consideration of the Aromatic Polyamides", J. W. Rothuizen, Oct. 2, 1975, 25 pages.

Primary Examiner—Dwight G. Diehl
Attorney, Agent, or Firm—H. W. Oberg, Jr.; C. H. Castleman, Jr.; Jack E. Ebel

[57] ABSTRACT

A toothed power transmission belt having a high modulus polyurethane body, an aramid type -II tensile member occupying up to about 88 percent of the belt width, and a wear-resistant fabric disposed along the belt inner surface at the tooth flanks.

4 Claims, 3 Drawing Sheets

TOOTHED BELT

BACKGROUND OF THE INVENTION

The invention relates to toothed belts adapted for synchronous motion transmission, but more particularly, the invention relates to a toothed belt constructed with materials of requisite properties that combine with each other to give the belt significantly improved performance characteristics over prior art belts.

Current methods for improving performance of toothed belts are to alter belt tooth profile, tooth pitch, tooth reinforcement material, elastomer compounding, and even sprocket configuration. Improvements in belt load carrying life have increased in small increments in response to such alterations. Several belt tooth profiles have evolved and may generally be characterized in longitudinal cross section as trapezoidal as shown in U.S. Pat. No. 2,507,852; round or curvilinear as shown in U.S. Pats. Nos. 3,756,091 or 4,037,485; and truncated round as shown in U.S. Pat. No. 3,977,265. It is estimated that over 90 percent of the toothed belts used for other than fractional horsepower transmission, are of the type with an elastomeric matrix of rubber, synthetic rubber, or blends thereof that form an outer layer and a toothed inner layer which together sandwich a spirally wound cord or cable that forms a tensile member. The outer layer optionally includes some type of embedded fibrous reinforcement whereas the inner layer forming the belt teeth customarily has a fibrous reinforcement embedded along its exterior surface to provide a wear-resistant surface while simultaneously enhancing tooth shear strength. Examples of belts with fabric along the peripheral surface of their inner layer are shown in U.S. Pats. Nos. 2,507,852; 4,037,485; 3,937,094; and 3,964,328.

U.S. Pat. No. 3,937,094 teaches that belt performance and life are improved by increasing tooth shear modulus with two layers of fabric at the tooth peripheral surface. Another technique to enhance belt peformance is to change the belt elastomer. For example, belts constructed with urethane may exhibit improved performance in terms of life and horsepower transmitting capability over similarly constructed belts made with rubber because urethane is generally recognized as being "tougher" than rubber. An example of such a belt is described in U.S. Pat. No. 3,964,328.

A need for what is described as "a substantially inextensible tensile member" is recognized for all such belts to maintain a tooth-to-tooth pitch so that a belt will satisfactorily mesh with a sprocket. However, as recognized in U.S. Pat. No. 4,047,44, a tensile member is really not inextensible and belt performance may be enhanced by altering the pitch of driver and driven sprockets to adjust for belt length changes at different power loads. Fiberglass with a greige Young's modulus of $10.0 \times 10^6$ psi is the predominant material presently used in rubber-type toothed belts. Occasionally, metal cable with a Young's modulus of $20 \times 10^6$ psi is used as a tensile member. Aramid fiber with a greige Young's modulus $90 \times 10^6$ psi has been used in toothed belts made with rubber or urethane elastomers. An example of an aramid fiber having a yarn modulus of $9.0 \times 10^6$ psi is sold under the trademark "Kevlar" by Du Pont. Aramid fiber with a yarn modulus of $9.0 \times 10^6$ psi is herein referred to as "aramid, type I" or "aramid type I fiber."

Whatever the elastomeric material, a belt tensile member is typically formed of helically spiralled cords or cables lying side-by-side at a desired number of cords per unit belt width so that the belt has a requisite tensile modulus per unit width to control belt strain for maintaining a satisfactory tooth pitch. The load carrying lives of toothed belts tend to be unaffected by the type of cord tensile material - provided that some minimum tensile modulus is maintained. It should be noted that the process of forming a tensile member from greige cord usually decreases the tensile strength of the cord because the cord is severally bent and twisted during its processing. Nevertheless, greige cord characteristics are listed in the following examples for comparative purposes because the tensile members are formed in somewhat similar manners (i.e., they are all bent and twisted during forming).

EXAMPLE 1

To illustrate the ineffectiveness that various high modulus tensile member materials have on load carrying life, rubber belts of essentially the same construction are built and tested using three different tensile member materials spiraled at nine ends per inch of belt width.

A. Tensile Member Characteristics per Strand

| Material | Filament Young's Modulus (greige, $10^6$ psi) | Gauge (in.) | Total Fiber Area (in$^2$) | Processed Cord Tensile Strength (greige, lbs/in$^2$) |
| --- | --- | --- | --- | --- |
| Belt Type 1 Fiber glass | 10.0 | .099 | .003259 | 162.627 |
| Belt Type 2 Aramid, Type 1 | 9.0 | .078 | .002691 | 297,287 |
| Belt Type 3 Steel | 20.0 | .067 | .001996 | 275,551 |

B. Belt Configuration

Elastomer: Neoprene (70-80 durometer, 490 psi tensile modulus of at least 100% elongation)
Tooth Type: Trapezoidal (RMA Section XH)
Tooth Pitch: 0.875
Tooth Surface: 0.045 in. crimped nylon fabric Reinforcement
Belt Length: 56 in.
Belt Width: 1 in.

C. Comparative Test of Tensile Member Materials

The belts are operated over 20 tooth sprockets (5.570 pitch diameter) at 1750 rpm at continuous horsepower levels to failure to show the affect that tensile member material has on belt load carrying life. FIG. 4 shows that tensile material modulus has very little effect on belt load carrying life. Generally, the rubber belts of 1 in. top width operate for 1300 hours at 10 horsepower and decrease to 20 hours of operation at 30 horsepower. All belts failed from dislodged or worn belt teeth. It is clear from FIG. 4 that the greige Young's modulus of traditional tensile member materials do not have any significant affect on belt load carrying life. This is not too surprising because the theoretical tension per cord at 10 horsepower is 17.8 lbs. and the theoretical tension per cord at 30 horsepower is 3 times the amount or 53.4 lbs. Such loads are only a fraction of the lowest of the 9 cord theoretical greige tensile strength of 4770 lbs. for a 1 inch wide belt.

EXAMPLE 2

To illustrate the affect that tooth shape has on belt load carrying life, rubber belts with round type teeth are built and tested using a fiber glass tensile member spiraled at nine ends per inch.

A. Tensile Member Characteristic per Strand

| Material | Filament Young's Modulus (greige, $10^6$ psi) | Gauge (in.) | Total Fiber Area (in$^2$) | Processed Cord Tensile Strength (greige, lbs/in$^2$) |
|---|---|---|---|---|
| Belt Type 4 Fiber glass | 10.0 | .099 | .003259 | 162,627 |

B. Belt Configuration

Elastomer neoprene (70–80 durometer, 490 psi tensile modulus at 100% elongation)
Tooth Type round (U.S. Pat. No. 3,756,091)
Tooth Pitch 14mm 0.551 in.)
Tooth Surface 0.045 in. crimped nylon fabric Reinforcement
Belt Length 63.4 in.
Belt Width 1 in.

C. Comparative Test of Tooth Shape

The belts are operated over 32 tooth (5.614 in. pitch diameter) sprockets at 1750 rpm at continuous horsepower levels to failure to show the affect that tooth shape has on belt load carrying life. FIG. 4 shows that the round tooth belts operate for substantially the same lives as trapezoidal tooth belts of similar size and construction. As in Example 1, the round tooth belts operate for 1300 hours at 10 horsepower and decrease to 20 hours of operation at 30 horsepower. All belts failed from dislodged or worn belt teeth. It is clear from FIG. 4 that belt tooth shape does not have any significant affect on belt load carrying life.

EXAMPLE 3

To illustrate the affect that an elastomer has on load carrying life, polyurethane belts with round type teeth are built to substantially the same configuration as the belts in Example 2 but with an aramid type 1 tensile member spiraled at nine ends per inch.

A. Tensile Member Characteristics per Strand

| Material | Filament Young's Modulus (greige, $10^6$ psi) | Gauge (in.) | Total Fiber Area (in$^2$) | Processed Cord Tensile Strength (greige, lbs/in$^2$) |
|---|---|---|---|---|
| Belt Type 5 Aramid Type I | 9.0 | .078 | .002691 | 297,287 |

B. Belt Configuration

Elastomer polyurethane (adipriene, 90–95 durometer, 1500 psi tensile modulus at 100% elongation)
Tooth Type round (U.S. Pat. No. 3,756,091)
Tooth Pitch 14mm (0.551)
Tooth Surface 0.040 in. crimped nylon fabric Reinforcement
Belt Length 69.45 in.
Belt Width 1 in.

C. Comparative Test of Elastomers

The belts are operated over 32 tooth (5.614 in. pitch diameter) sprockets at 1750 rpm at continuous horsepower levels to failure to show the affect that an elastomer has on belt load carrying life. The rubber/glass and the rubber/steel belts have a slightly lower processed greige tensile strength than the tensile strength of the urethane/aramid -I belts but the effect of tensile member elongation on pitch change under load (strain) is substantially the same for all belts. Note that expected belt elongation is minimal because the maximum operating belt loads per cord of 53 lbs. are less than 10 percent of belt tensile strength. Nevertheless, FIG. 5 clearly shows substantially a twofold increase of the urethane/aramid -I belt over the rubber/glass or rubber/aramid -I belt at higher horsepower loads. The urethane/aramid-I belt is capable of operating at 55 horsepower for 20 hours while the rubber/glass belts are only capable of operating at 30 horsepower for 20 hours. In terms of total expected life at 30 horsepower, the urethane/aramid-I belts exhibit a 15 fold increase in hours of operation (load carrying life). In other words, while the rubber/glass or rubber/aramid -I substantially the same tensile member strength per unit width for maintaining a tooth-to-tooth pitch, the polyurethane/aramid-I belts have about 1.8 times the load carrying capability for an equivalent life. The performance improvement of the urethane belt over the rubber belt is directly attributable to the polyurethane elastomer of the described construction.

U.S. Pat. No. 4,047,444 teaches that the difference between belt pitch under tensile load and sprocket tooth pitch affects belt life. In some cases, belt life is improved by changing sprocket tooth pitch. The same type of improvement in performance may be accomplished by changing belt tooth pitch instead of sprocket tooth pitch.

EXAMPLE 4

To illustrate the affect that tooth pitch changes may have on load carrying life, polyurethane belts with round teeth are built with the same construction as the belts of Example 3 (i.e., Belt Type 5) except that the tooth pitch is changed from 14 mm to 13.9 mm.

The belts are operated over 32 tooth (5.614 in. pitch diameter) sprockets at 1750 rpm at continuous horsepower levels to failure to show the affect that tooth pitch may have on belt load carrying life. As illustrated by FIG. 5, belt load carrying life at higher loading is substantially increased when the pitch of a urethane/aramid -I belt is reduced from 14.0 mm to 13.9 mm and operated on the same 14.0 mm standard 32 tooth sprockets. While it is possible to enhance belt load carrying life by adjusting sprocket tooth pitch or belt tooth pitch for high horsepower/torque loads, such measures decrease the belt life at lower loads and voids any large degree of industrial standardization for belts and sprockets. The load carrying life for standard pitch belts and the inventory problems associated with adjusting belt or sprocket tooth pitch to achieve higher performance levels has in some degree limited the acceptance of toothed belt drives as suitable replacements for chain drives.

SUMMARY OF THE INVENTION

In accordance with the invention, a toothed belt construction is provided that yields substantial and unexpected increases in predicted belt load-life. The significant multiple increase in belt load-life is illustrated with a belt construction using polyurethane elastomer.

The belt has a tensile member interpositioned between two generally polyurethane elastomer layers where one layer forms the top of the belt and the other layer forms a plurality of belt teeth. The tensile member is formed with aramid type II fiber exhibiting a greige filament Young's modulus of at least about $18 \times 10^6$ psi (124,000 MPa). An example of an aramid fiber having a yarn modulus of $18 \times 10^6$ psi is manufactured by Du Pont and sold under the trademark "Kevlar 49." Aramid fiber with a yarn modulus of $18 \times 10^6$ psi is herein referred to as "aramid, type II", or "aramid type II fiber." A reinforcement is disposed at the peripheral surface of the toothed layer to enhance tooth shear modulus, provide a wear-resistant surface, and provide a means for maintaining a low coefficient of friction between belt tooth flanks and sprocket teeth.

The belts have tooth flanks with a low coefficient of friction (i.e., less than 0.4) surface along the peripheral belt tooth flanks such as provided with some fabrics and special polymers. Belts so constructed exhibit about 2 to 4 times increase in load capacity for equivalent life over belts of the same construction except for a tensile member formed from aramid -I fiber. The belt of the invention has sufficient load life performance to make it a suitable replacement for some chain drives.

Other features and advantages of the invention will be apparent after reviewing the figures and description thereof wherein.

DESCRIPTION OF PREFERRED EMBODIMENTS

Figure 1:
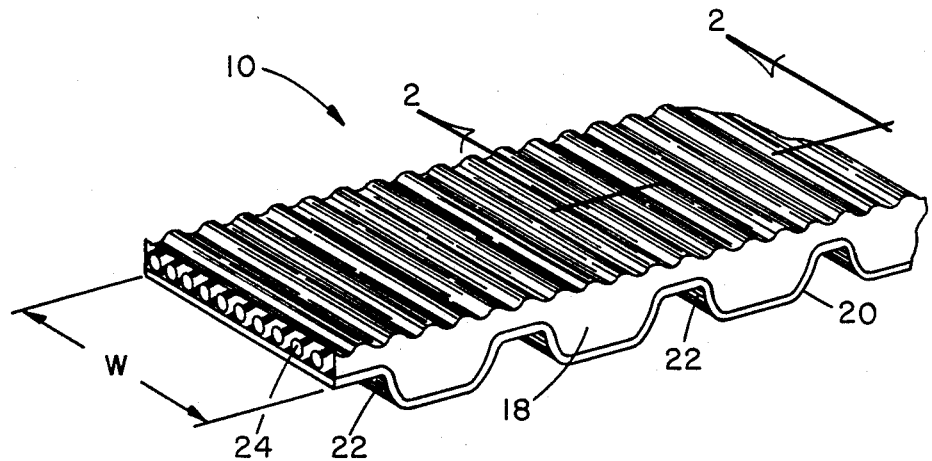
FIG. 1 is a partial isometric view of a toothed belt of the invention.
Figure 2:
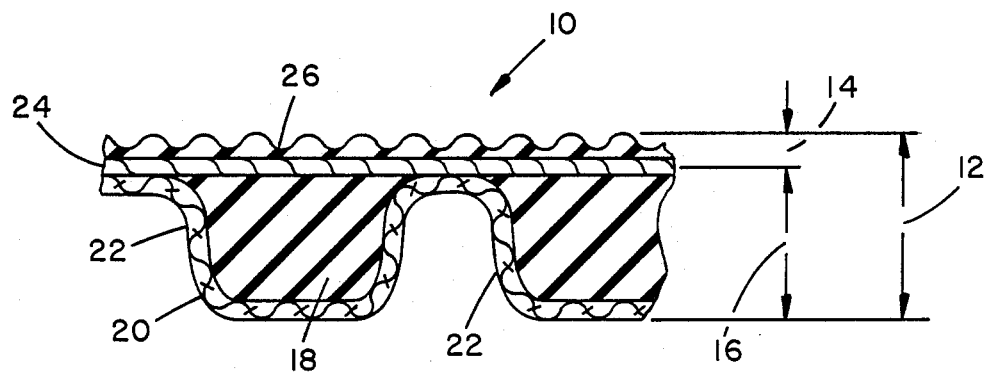
FIG. 2 is a sectional view taken along the line 2—2 of FIG. 1.
Figure 3:
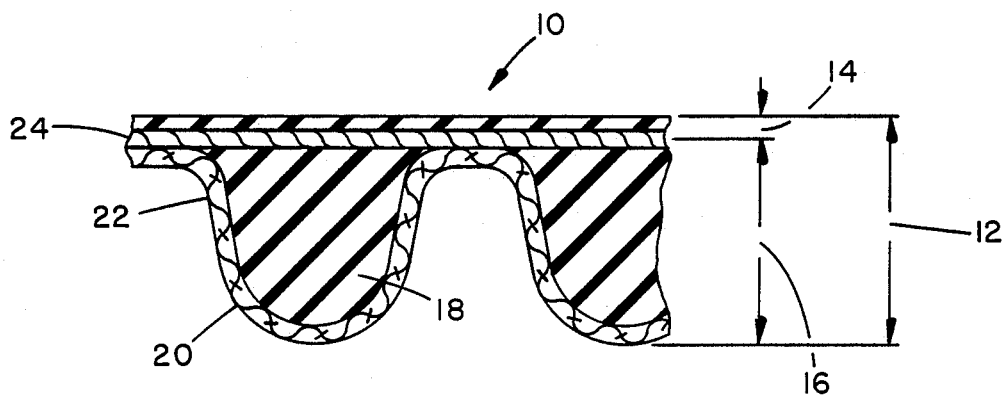
FIG. 3 is a view similar to FIG. 2 but showing a round tooth belt.
Figure 4:
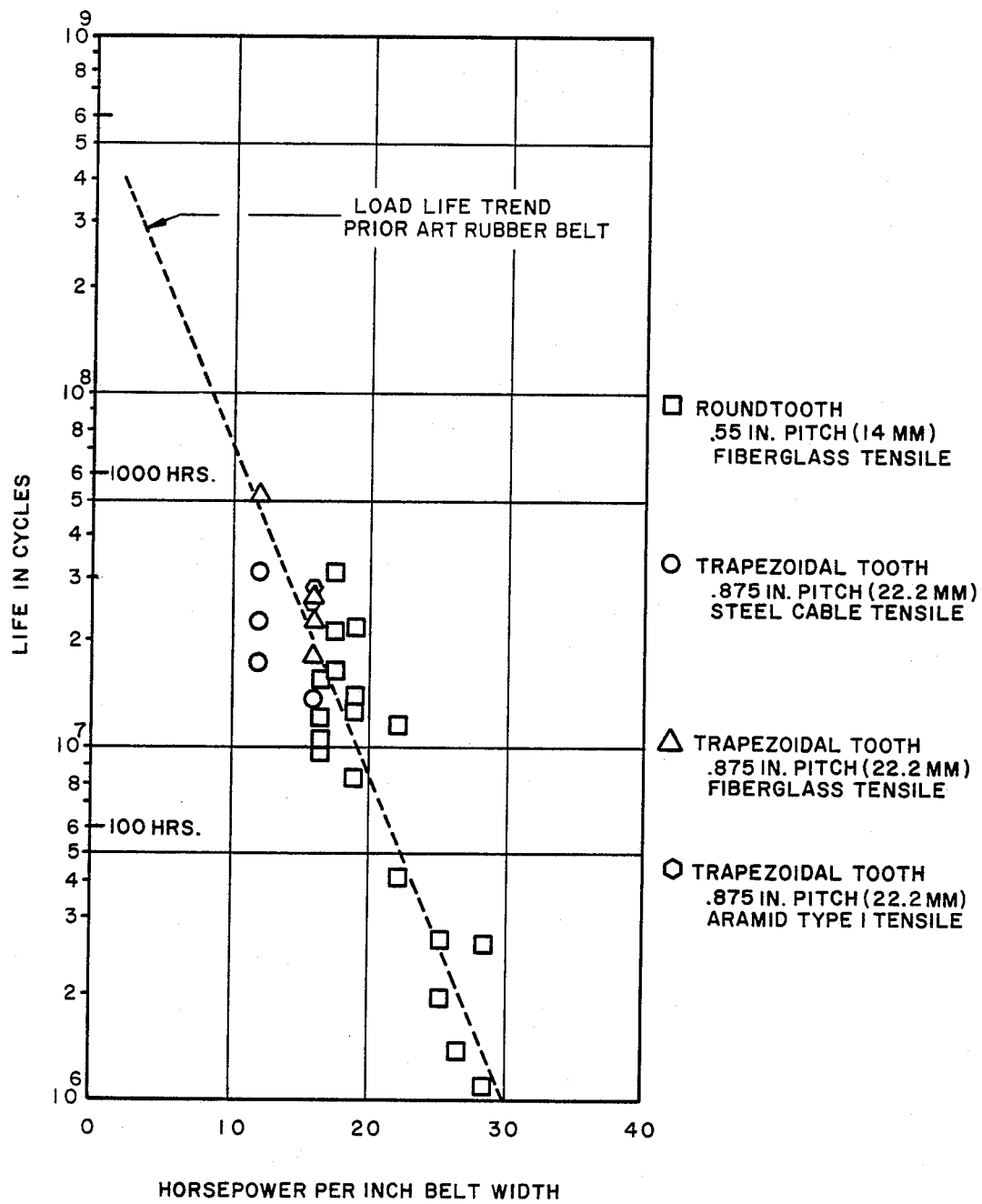
FIG. 4 is a load-life chart for prior art rubber type belts.

Referring to FIGS. 1–3, the belt 10 of the invention has generally an elastomeric body 12 of polyurethane that defines an outer layer 14 and an inner layer 16 with a plurality of integrally molded and spaced belt teeth 18. A wear-resistant fabric reinforcement 20 is disposed at a peripheral portion of the inner surface including teeth flanks 22. A tensile member of textile cord 24 is helically spiralled in spaced side-by-side fashion across the belt width W and is disposed between and bonded to the outer layer 14 and inner layer 16. The elements comprising the belt have minimum requisite properties that combine with each other to define a belt with a manifold increase in load life performance over prior art belts as outlined in the Background of the Invention.

The belt is fabricated using known processing techniques. The elastomeric body is cast of liquid polyurethane that, when cured, has a tensile modulus of at least about 1,500 psi at an elongation of 100 percent when tested using standard ASTM procedures. More preferably, the polyurethane exhibits a tensile modulus of at least about 1,700 psi at an elongation of 100 percent.

A plurality of transversely oriented grooves 26 may optionally be formed in the outer layer. While not necessary, the grooves 26 reduce belt weight and somewhat enhance belt flexibility.

The spaced teeth 18 defined by the body may have any of the desired cross sectional shapes such as trapezoidal, curvilinear, or curvilinear-truncated. Examples of applicable tooth shapes appear in U.S. Pat. No. 4,037,485 under prior art tooth shapes and as the inventive tooth shape of the U.S. Pat. No. 4,037,485.

Polyurethane elastomer exhibits a high coefficient of friction (e.g, about 0.65) with most sprocket materials. Consequently, it is necessary to reduce the coefficient of friction to be "non-aggressive" (e.g., below about 0.45) along the tooth flanks 22 as the belt teeth enter or leave a belt sprocket. The fabric 20 disposed at the peripheral portion of the inner surface at the belt teeth flanks not only provides wear-resistance, it also increases tooth shear strength and reduces the aggressiveness of the tooth flanks when entering belt sprocket teeth. Preferably, the fabric has a low coefficient of friction surface at least along the tooth flanks as is disclosed in U.S. Pat. No. 3,964,328. The fabric must also exhibit some stretchability to accommodate tooth deflection when a belt is in use. Crimped nylon fabric has proved satisfactory in the application.

The tensile member is cord made of aramid Type II fiber having a greige filament tensile modulus of at least about $18 \times 10^6$ psi. The actual built-in belt modulus will be somewhat lower as the greige fiber is twisted and bent during the cord forming and treating process. Once in the belt, it is almost impossible to determine the exact modulus of the tensile member.

The cord is helically spiralled across the width of the belt in spaced, side-by-side fashion. The cord occupies from about 56 to about 88 percent of the belt width, and more preferably from about 64 to about 81 percent from the belt width, and most preferably about 74 percent of the belt width. It is necessary that the cord be embedded in and substantially surrounded by the polyurethane body in such a manner that the cord bonds with the polyurethane body. If there is too much cord occupying the belt width, the teeth have a tendency to shear off under high torque loads because of insufficient bonding between the inner layer forming the teeth 16 and the outer layer 14. If the cord does not occupy a sufficient percentage of the belt width, there may be insufficient cord to carry the required loads under desirable belt operating conditions.

To test for sufficient cord to elastomer bonding, a belt of the invention is built and transversely cut leaving one intact cord that is also severed one inch away from the transverse cut. The belt is tensioned across the transverse cut and the force required to pull the intact cord longitudinally from its one inch embedment in elastomer is measured. Dividing the force required to pull the cord from the elastomer by the cylindrical 1 inch length based on the cord gauge diameter, gives a cord to elastomer bonding value in pounds per square inch. Bonding values of at least about 600 psi are required for satisfactory lives of belts operating at high horsepower loads.

EXAMPLE 5

To illustrate the effectiveness of how the requisite materials combine to give a belt of the invention significantly improved performance, polyurethane belts are built and tested with a tensile member spiralled at nine ends per inch.

A. Tensile Member Characteristics per Strand

| Material | Filament Young's Modulus (greige, $10^6$ psi) | Gauge (in.) | Total Fiber Area (in$^2$) | Processed Cord Tensile Strength (greige, lbs/in$^2$) |
| --- | --- | --- | --- | --- |
| Belt Type 6 Aramid Type II | 18 | .078 | 0.003037 | 293052 |

B. Belt Configuration

Elastomer: polyurethane (adipriene, 90–95 durometer, 1500 psi tensile modulus at 100% elongation)
Tooth Type: round (U.S. Pat. No. 3,756,091)
Tooth Pitch: 14 mm (0.551)
Tooth Surface: 0.040 in. crimped nylon fabric Reinforcement
Belt Length: 69.45 in.
Belt Width: 1 in.

C. Comparative Test

Figure 5:
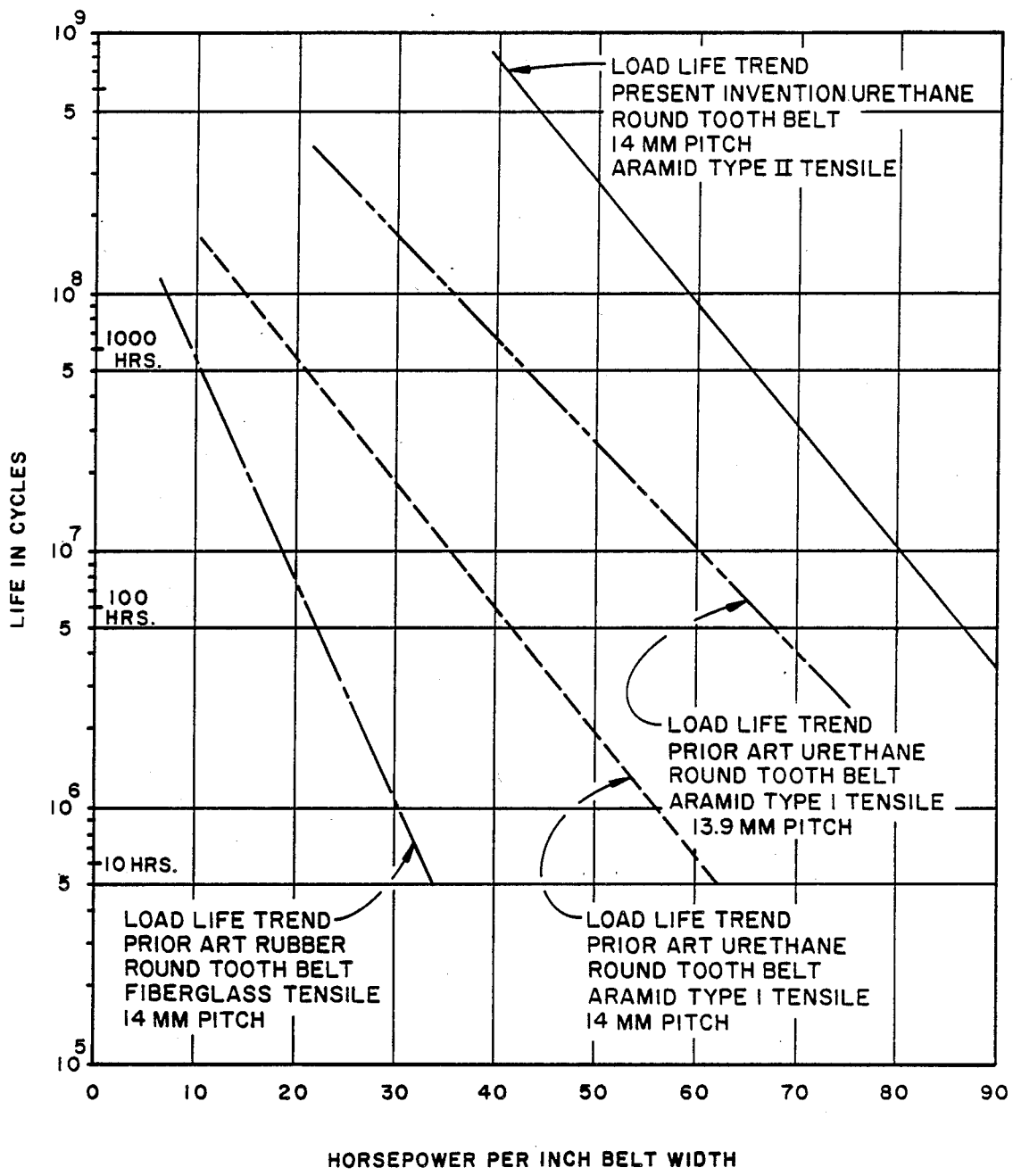
FIG. 5 is a load-life chart comparing prior art rubber type and polyurethane type belts to the present invention.

The belts are operated over 32 tooth (5.614 in. pitch diameter) sprockets at 1750 rpm at continual horsepower levels to failure to show the effect that the material combination of the invention has on load carrying life. The urethane/aramid II belts have substantially the same configuration as those listed for Example 3. Note that the cord breaking strength for each belt is approximately the same (the urethane/aramid -I belts have about the same greige cord tensile strength as the urethane/aramid type II belts (i.e., so that the expected effective tensile member elongation on pitch change under load (strain) is substantially the same for both belts.) Here again the expected belt elongation is minimal because the maximum operating belt load per cord of 106 lbs. are less than 15 percent of the belt tensile strength per inch. Nevertheless, FIG. 5 clearly shows substantially a 100-fold increase with belts of a urethane/aramid -II belt over a urethane/aramid -I of equal pitch at the higher horsepower load. The urethane/aramid -II belt is capable of operating at 60 horsepower for 1,600 hours while the urethane/aramid -I belt modified for pitch operates at about 180 hours at 60 horsepower. Hence, the urethane/aramid -II belt of the invention exhibits a 9-fold increase over the best known prior art belts. The synergistic improvement in belt performance is believed to be directly attributable to the combination of materials as described above.

The foregoing detailed description is made for purpose of illustration only and is not intended to limit the scope of the invention which is to be determined from the appended claims.

What is claimed is:

1. A toothed power transmission belt having width and comprising:
   a polyurethane body having a 100 percent tensile modulus of at least about 1,500 psi, the body defining an outer layer and an inner layer with integrally molded and spaced belt teeth with flanks;
   a wear-resistant fabric reinforcement disposed at a peripheral portion of the inner layer at the teeth flanks;
   a tensile member of textile cord helically spiralled in spaced, side-by-side fashion and disposed between and bonded to the inner and outer layers, the cord made of aramid type II fiber having a greige filament tensile modulus of at least about $18 \times 10^6$ psi, and the cord occupying from about 56 to about 88 percent of the belt width.

2. The belt as claimed in claim 1 wherein the cord occupies from about 64 to about 81 percent of the belt width.

3. The belt as claimed in claim 1 wherein the cord occupies about 74 percent of the belt width.

4. The belt as claimed in claim 1 wherein the cord exhibits a bond with the polyurethane body of at least 600 pounds per square inch of cylindrical cord surface as measured by a force required to pull a severed cord from one longitudinal inch embedment in the polyurethane body.

* * * * *